(12) United States Patent
Ahn et al.

(10) Patent No.: US 11,448,376 B2
(45) Date of Patent: Sep. 20, 2022

(54) ILLUMINATION PATTERN CHANGING APPARATUS

(71) Applicants: HYUNDAI MOTOR COMPANY, Seoul (KR); KIA CORPORATION, Seoul (KR)

(72) Inventors: Byoung Suk Ahn, Gwacheon-si (KR); Jung Wook Lim, Seoul (KR); Ki Hong Lee, Seoul (KR); Sung Ho Park, Seoul (KR); Seung Sik Han, Hwaseong-si (KR); Ji Yeon Kim, Gyeongsan-si (KR); Jin Hee Yu, Gyeongsan-si (KR)

(73) Assignees: Hyundai Motor Company, Seoul (KR); Kia Corporatoin, Seoul (KR)

( * ) Notice: Subject to any disclaimer, the term of this patent is extended or adjusted under 35 U.S.C. 154(b) by 0 days.

(21) Appl. No.: 17/314,855

(22) Filed: May 7, 2021

(65) Prior Publication Data
US 2022/0099263 A1 Mar. 31, 2022

(30) Foreign Application Priority Data

Sep. 29, 2020 (KR) .......................... 10-2020-0126924

(51) Int. Cl.
*B60Q 1/00* (2006.01)
*F21S 41/24* (2018.01)
*F21S 41/141* (2018.01)
*F21V 8/00* (2006.01)
*F21S 43/239* (2018.01)
*F21W 102/00* (2018.01)

(52) U.S. Cl.
CPC .............. *F21S 41/24* (2018.01); *F21S 41/141* (2018.01); *F21S 43/239* (2018.01); *G02B 6/001* (2013.01); *F21W 2102/00* (2018.01)

(58) Field of Classification Search
CPC ........ F21S 41/24; F21S 41/141; F21S 43/245; F21S 10/007; G02B 6/001; G02B 6/04; G02B 6/0008; G02B 6/0005; F21V 3/023; F21V 3/02; F21V 14/00; F21V 11/18; F21V 1/10; F21V 1/00
See application file for complete search history.

(56) References Cited

U.S. PATENT DOCUMENTS 3,701,498 A * 10/1972 Ferrara ................... B64D 47/06
244/17.11
5,488,509 A * 1/1996 Takahashi ............ G02B 6/0006
359/385
6,236,792 B1 * 5/2001 Fung .................... G02B 26/008
385/115

FOREIGN PATENT DOCUMENTS

CN 210874115 U * 6/2020
JP 2005-019155 1/2005

(Continued)

*Primary Examiner* — Omar Rojas Cadima
(74) *Attorney, Agent, or Firm* — Fox Rothschild LLP

(57) ABSTRACT

An illumination pattern changing apparatus is provided. The apparatus includes a stationary plate, a rotary plate disposed spaced apart from the stationary plate, the rotary plate configured to be rotatable, and a light source module including a light source configured to irradiate light, and a plurality of optical fibers configured to emit the light when the light is irradiated, wherein a first end of each optical fiber is connected to the stationary plate and a second end of each optical fiber is connected to the rotary plate to form an illumination pattern, and the illumination pattern is changed when the rotary plate is rotated.

17 Claims, 13 Drawing Sheets

(56) References Cited

FOREIGN PATENT DOCUMENTS

KR 10-2014-0109665 9/2014
WO WO2016/204779 A1 12/2016

* cited by examiner

ILLUMINATION PATTERN CHANGING APPARATUS

CROSS-REFERENCE TO RELATED APPLICATION

This application claims priority to and the benefit of Korean Patent Application No. 10-2020-0126924, filed on Sep. 29, 2020, the disclosure of which is herein incorporated by reference in its entirety.

TECHNICAL FIELD

The present disclosure relates to an illumination pattern changing apparatus.

BACKGROUND

In general, a vehicle is provided with an illumination apparatus configured to enable a driver to clearly view objects in a driving direction during night driving and to inform other vehicles or people on streets of the driving state of the vehicle.

In addition to the function to inform of the driving state, design of such an illumination apparatus is important. That is, an image of the vehicle is changed based on an illumination image provided by the illumination apparatus. Consequently, it is necessary to improve the grade of the illumination image provided by the illumination apparatus.

In recent years, therefore, various kinds of illumination apparatuses using optical fibers have been developed. The optical fibers emit light incident thereon outwards. Consequently, it is possible to realize various illumination images based on characteristics of the optical fibers. Even though the optical fibers are used, however, the illumination image is decided based on an initial design, whereby realization of various illumination images is limited.

The matters disclosed in this section are merely for enhancement of understanding of the general background of the disclosure and should not be taken as an acknowledgment or any form of suggestion that the matters form the related art already known to a person skilled in the art.

SUMMARY

The present disclosure provides an illumination pattern changing apparatus capable of realizing an illumination design through optical fibers and improving the grade and marketability of the illumination image through a change in the illumination design.

In some forms of the present disclosure, the above and other objects can be accomplished by the provision of an illumination pattern changing apparatus including a stationary plate, a rotary plate disposed spaced apart from the stationary plat, the rotary plate being configured to be rotatable, and a light source module including a light source configured to irradiate light and a plurality of optical fibers configured to emit light when the light irradiated from the light source is incident thereon, wherein one end of each of the optical fibers is connected to the stationary plate and the other end of each of the optical fibers is connected to the rotary plate in order to form an illumination pattern, and the illumination pattern is changed when the rotary plate is rotated.

The stationary plate and the rotary plate may be installed at a housing so as to be disposed opposite each other, the light source module may be installed at the housing on a stationary plate side, the plurality of optical fibers may be spaced apart from each other along the circumference of each of the stationary plate and the rotary plate so as to be connected to each other in a straight line in order to form an illumination pattern, and, when the rotary plate is rotated, the plurality of optical fibers may be staggered, whereby the illumination pattern may be changed.

The illumination pattern changing apparatus may further include a guide bracket configured to wrap the circumference of the rotary plate and to guide rotation and axial movement of the rotary plate.

A plurality of guide ribs may be formed on the circumferential surface of the rotary plate, and a plurality of guide recesses, into each of which a corresponding one of the guide ribs is inserted and each of which extends in a circumferential direction, may be formed along the circumference of the guide bracket.

Each of the guide recesses may extend so as to be inclined or curved in a direction in which the rotary plate is opposite the stationary plate.

The illumination pattern changing apparatus may further include a driving unit connected to the rotary plate, the driving unit being configured to generate rotary force such that the rotary plate is rotated.

A portion of the circumferential surface of the guide bracket may be open to form an opening configured to expose a portion of the circumferential surface of the rotary plate, and the driving unit may be connected to the rotary plate through the opening of the guide bracket.

A plurality of gear protrusions may be formed on the circumferential surface of the rotary plate, and the driving unit may include a gear portion engaged with the gear protrusions of the rotary plate and a driving portion configured to rotate the gear portion such that the rotary plate is rotated with the gear portion.

The stationary plate, the rotary plate, the light source module, and the guide bracket may constitute a single illumination assembly, and in the case in which a plurality of illumination assemblies is disposed in a horizontal direction, the guide bracket of each of the illumination assemblies may be provided with a plurality of openings formed so as to be opposite the openings of other guide brackets.

The plurality of rotary plates may be simultaneously rotatably connected to each other via connection portions disposed between the respective guide brackets so as to be connected to at least two rotary plates through the openings of the guide brackets The driving unit may be connected to one of the plurality of connection portions, whereby the plurality of rotary plates may be simultaneously rotated when the connection portion is rotated.

A plurality of gear protrusions may be formed on the circumferential surface of each of the rotary plates, and connection protrusions configured to be engaged with the gear protrusions may be formed on the circumferential surface of each of the connection portions.

In the case in which the stationary plate, the rotary plate, the light source module, and the guide bracket are disposed in plural in a vertical direction, a plurality of rotary plates and a plurality of guide brackets may be disposed in series above a single stationary plate, one end of each of the optical fibers constituting the optical module may be connected to the stationary plate, and the other end of each of the optical fibers may extend through the rotary plates and may be connected to the last rotary plate.

The driving unit may include a driving portion configured to generate rotational force and a driving link extending from the driving portion in the vertical direction, the driving link being provided with a plurality of gear fastening portions connected to the respective rotary plates through the openings of the guide brackets.

The gear fastening portions of the driving link may be configured so as to have smaller gear ratios thereof to the rotary plates in a direction away from the stationary plate.

Each of the gear fastening portions may include a driving gear coupled to the driving link so as to be rotated with the driving link and a driven gear engaged with the driving gear and a corresponding one of the rotary plates.

A plurality of guide ribs may be formed on the circumferential surface of each of the rotary plates, a plurality of guide recesses, into each of which a corresponding one of the guide ribs is inserted and each of which extends in a circumferential direction, may be formed along the circumference of each of the guide brackets, and each of the guide recesses of each of the guide brackets may be formed so as to have a long extension length in a direction away from the stationary plate.

DRAWINGS

Figure 4:
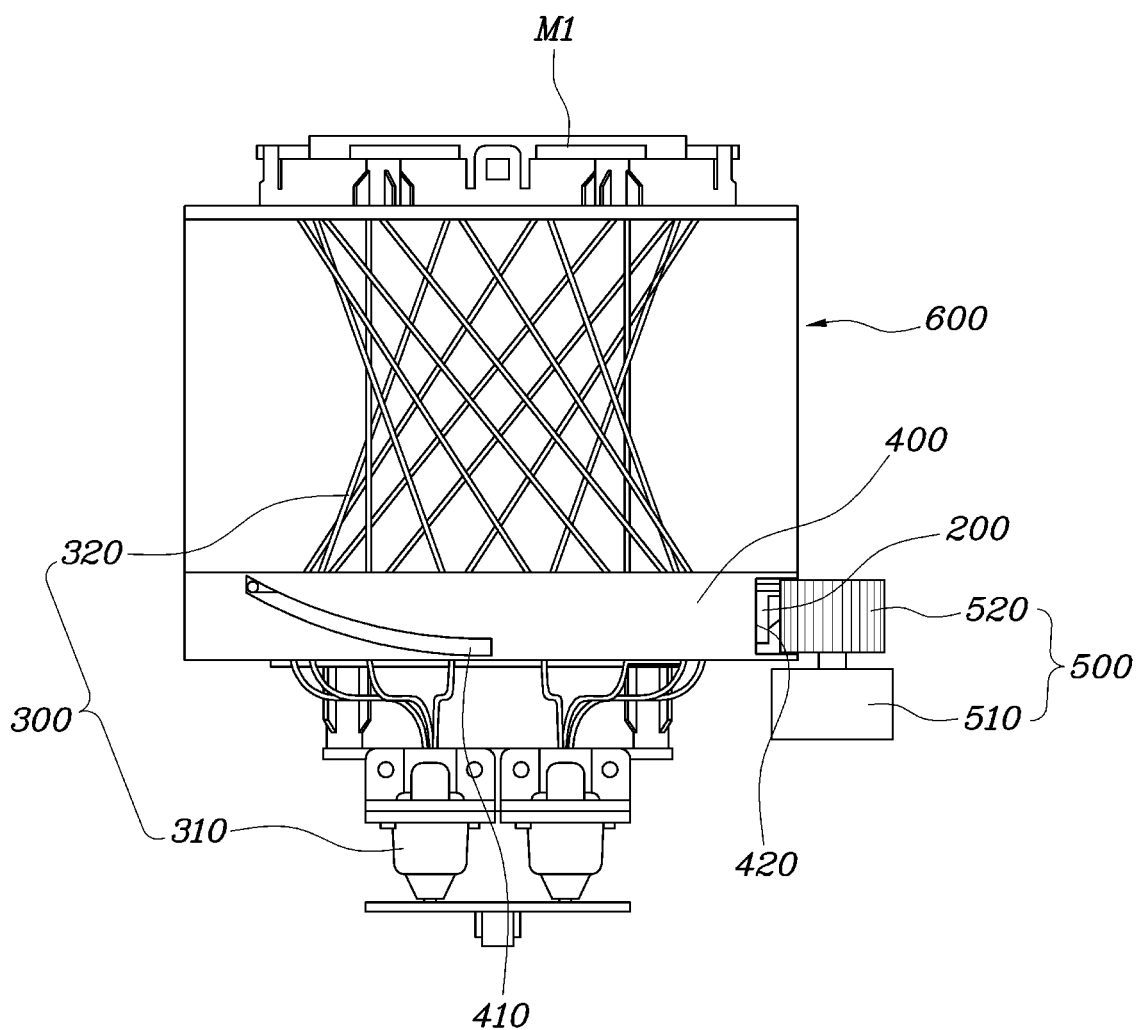
FIG. 4 is a view showing an embodiment in which a guide bracket is applied to the illumination pattern changing apparatus in some forms of the present disclosure.
Figure 5:
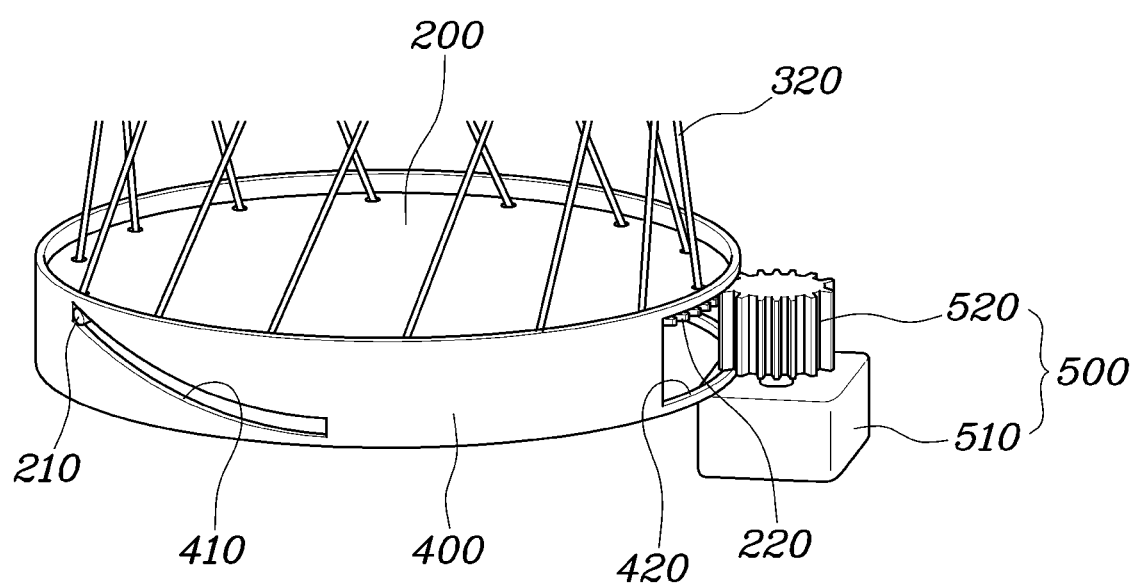
Figure 6:
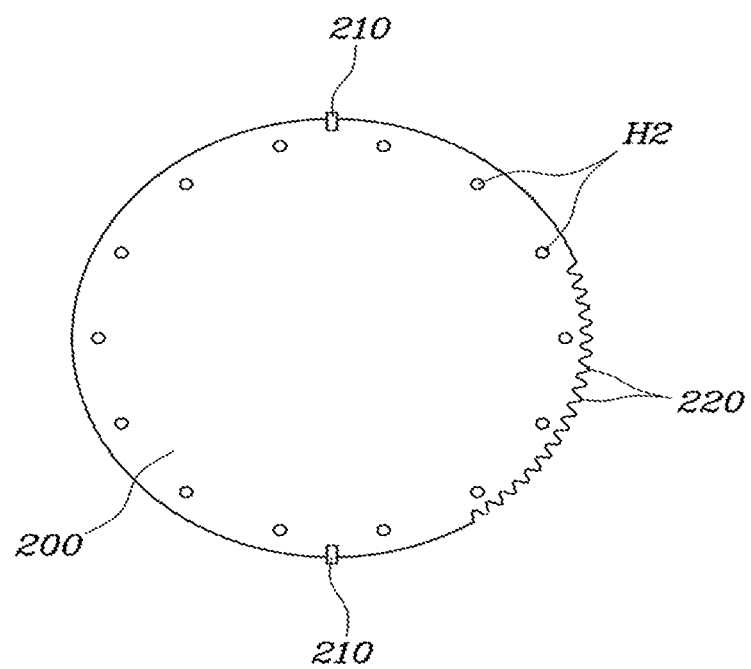
Figure 7:
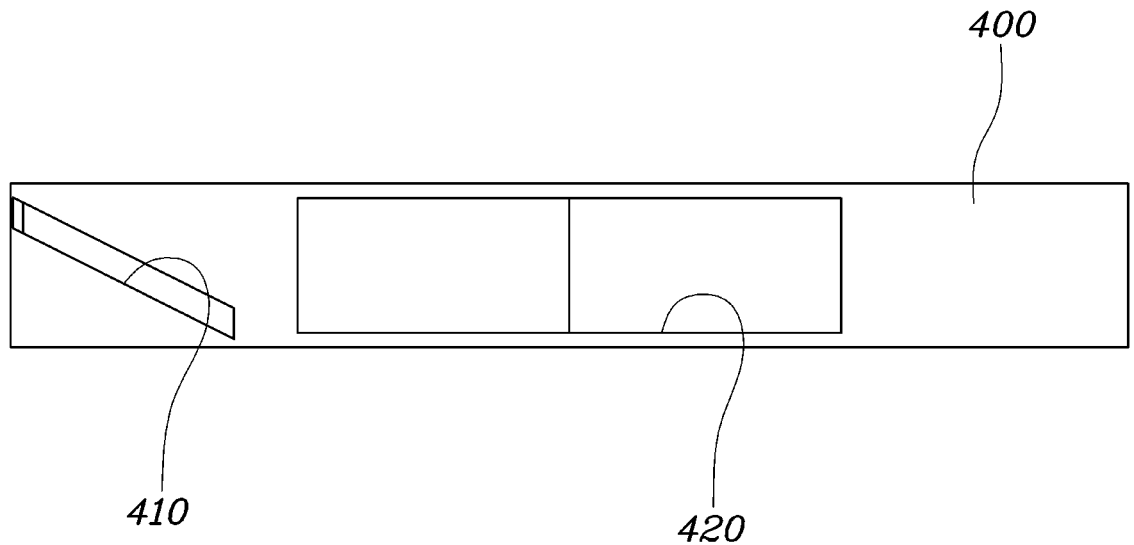
Figure 8:
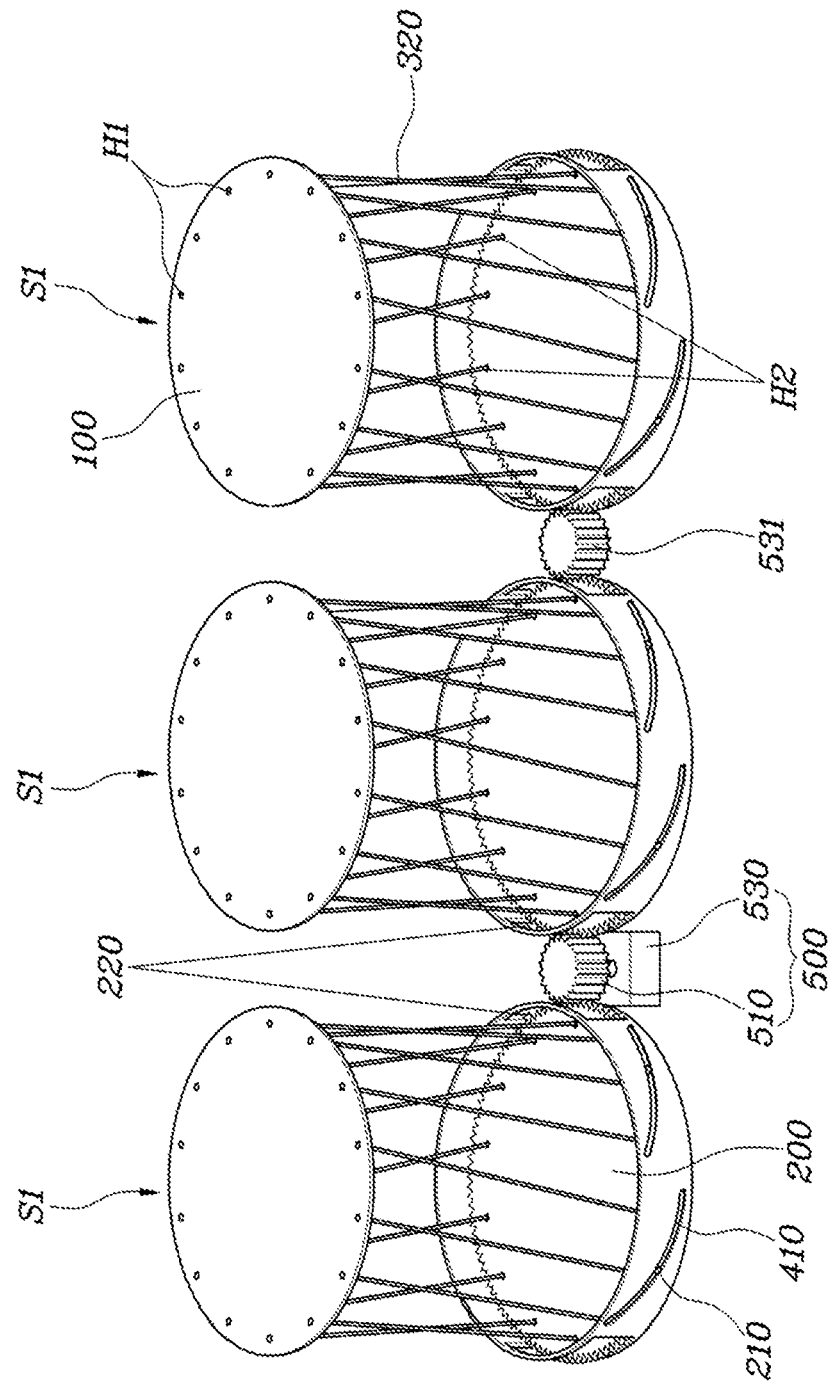
Figure 9:
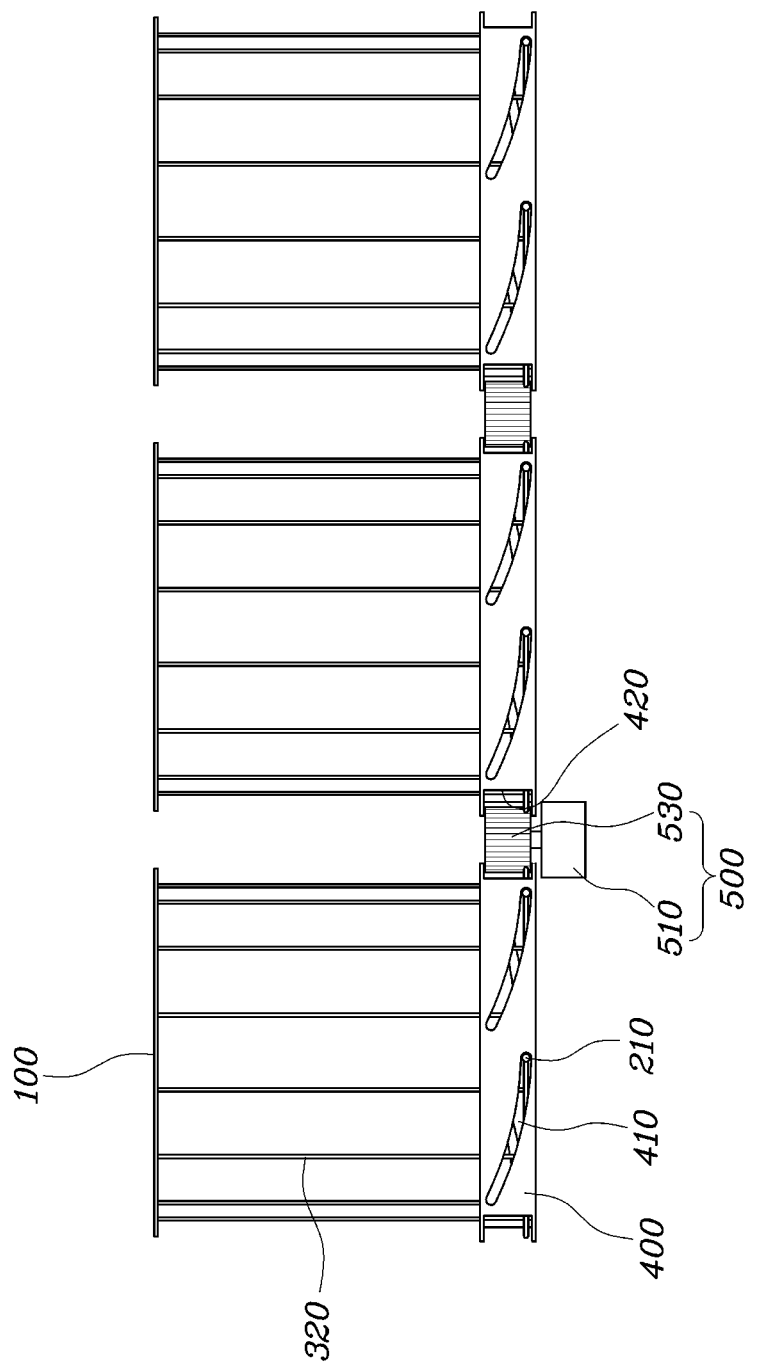
Figure 10:
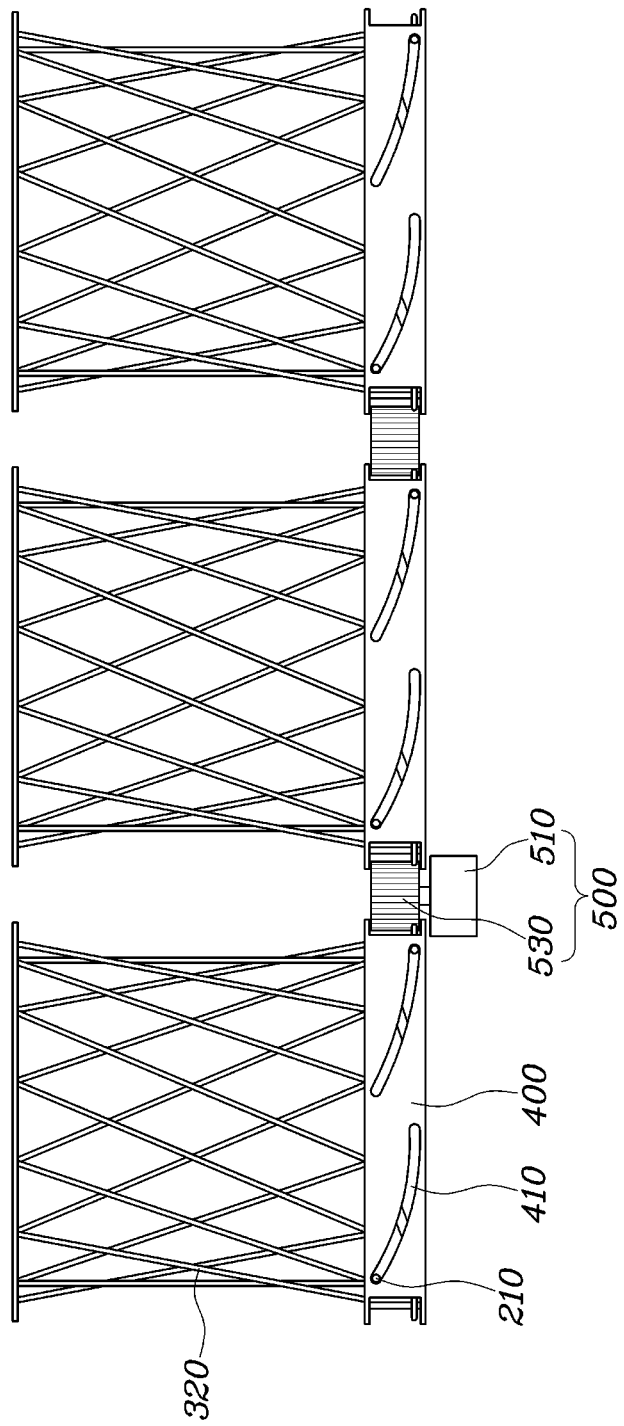
Figure 11:
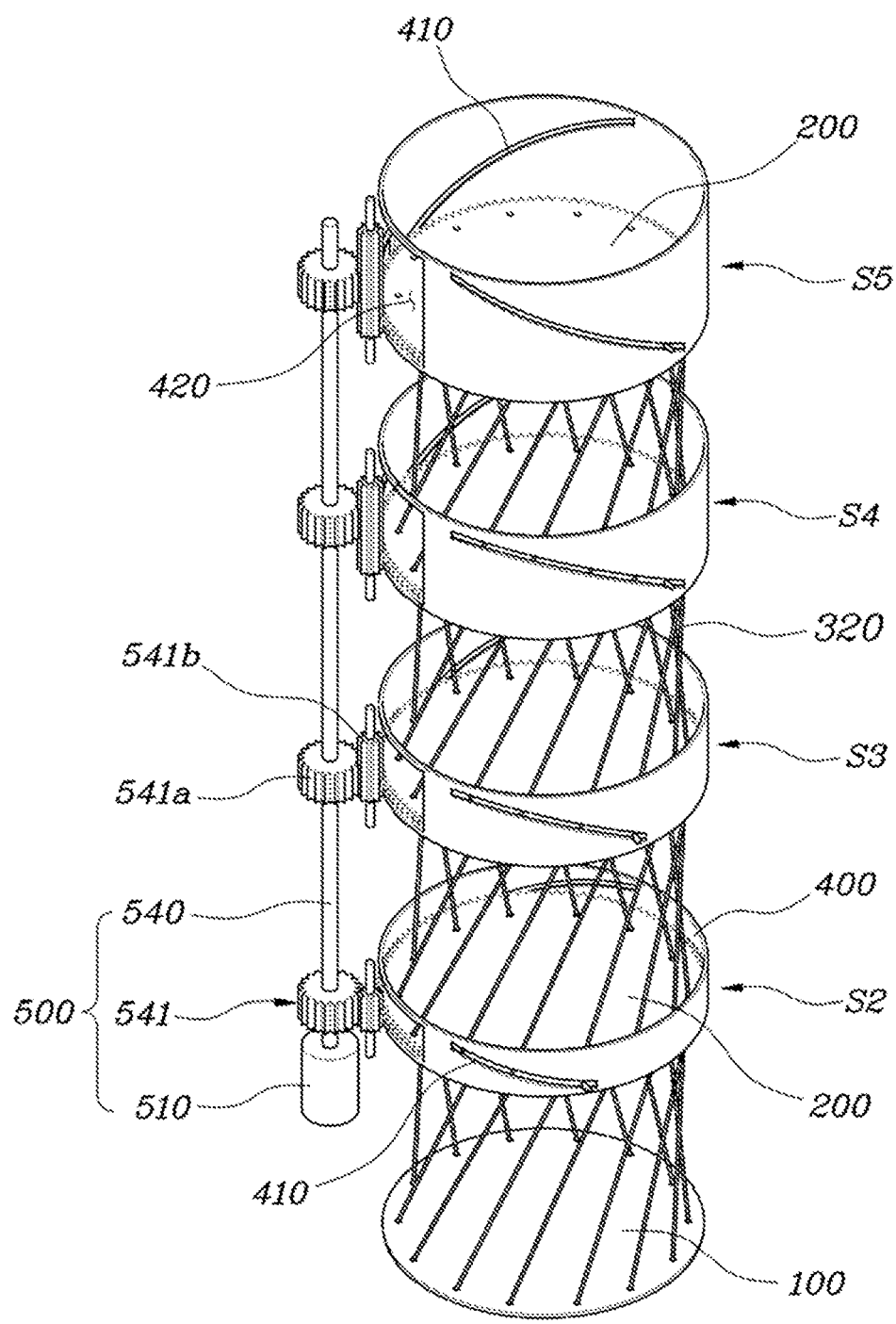
Figure 12:
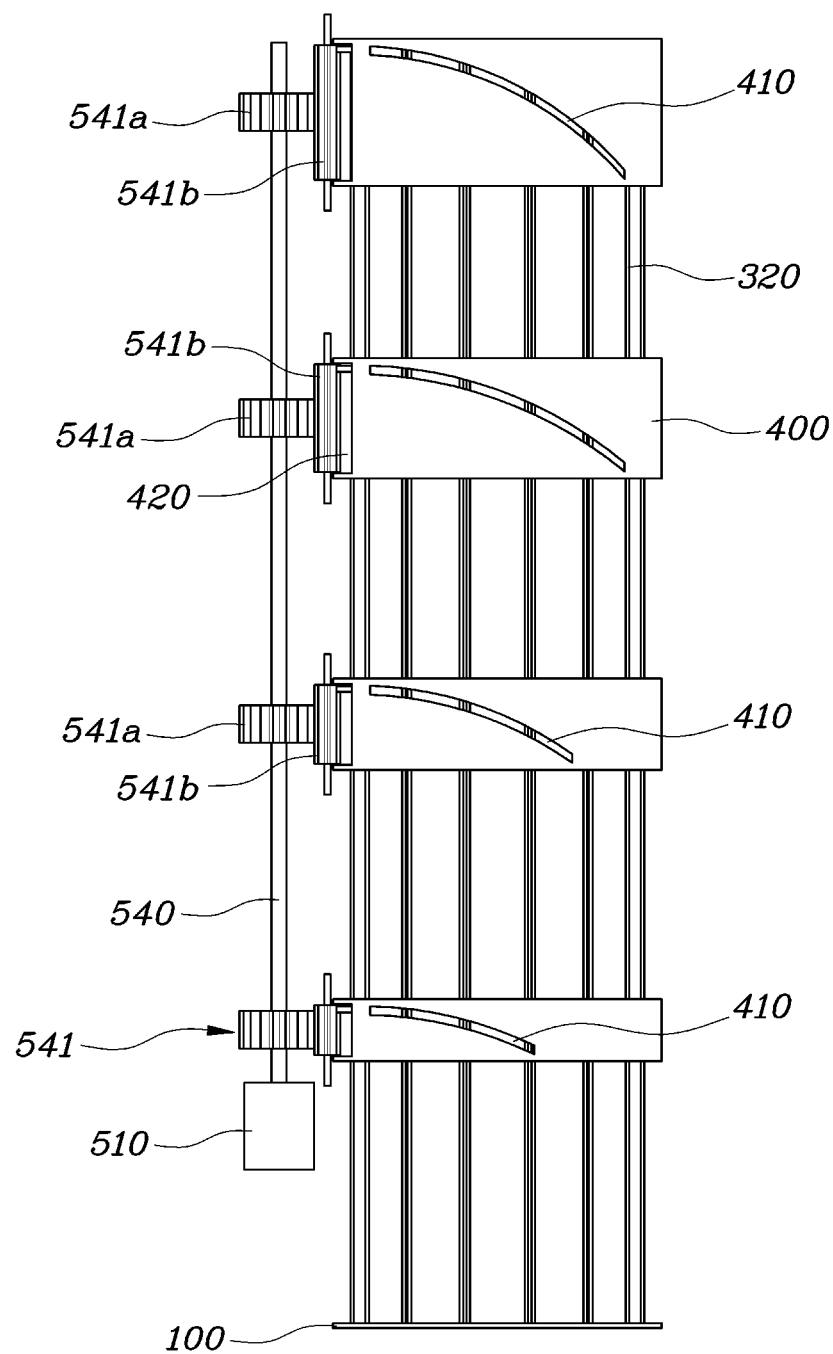
Figure 13:
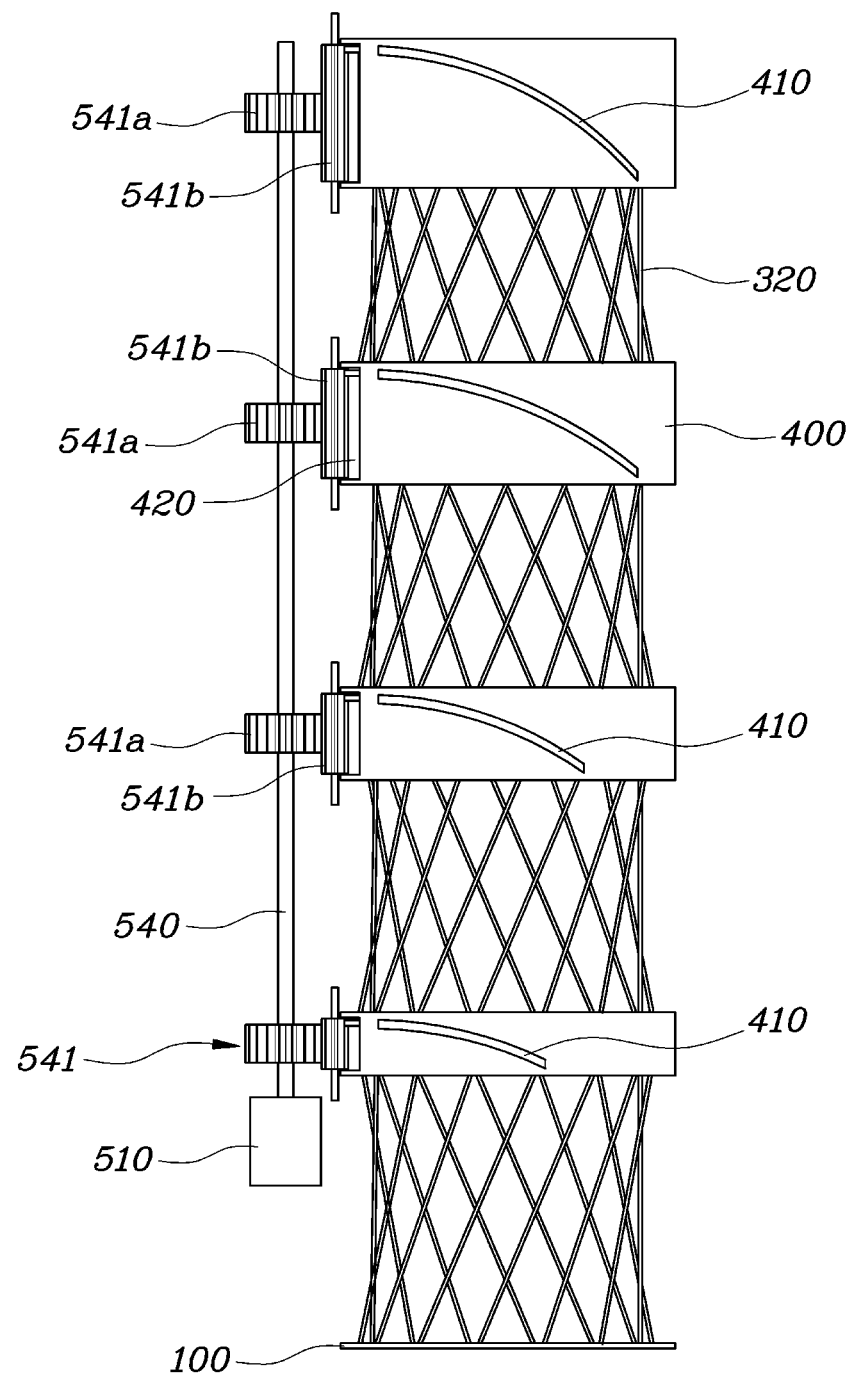

FIGS. 5, 6, and 7 are views illustrating a rotary plate, a guide bracket, and a driving unit of the illumination pattern changing apparatus shown in FIG. 4;

FIG. 8 is a view showing a horizontal arrangement structure of the illumination pattern changing apparatus;

FIGS. 9 and 10 are views showing states before and after operation of the illumination pattern changing apparatus based on the horizontal arrangement structure shown in FIG. 8;

FIG. 11 is a view showing a vertical arrangement structure of the illumination pattern changing apparatus; and FIGS. 12 and 13 are views showing states before and after operation of the illumination pattern changing apparatus based on the vertical arrangement structure shown in FIG. 11.

DETAILED DESCRIPTION

Hereinafter, an illumination pattern changing apparatus according to a preferred embodiment of the present disclosure will be described with reference to the accompanying drawings.

Figure 1:
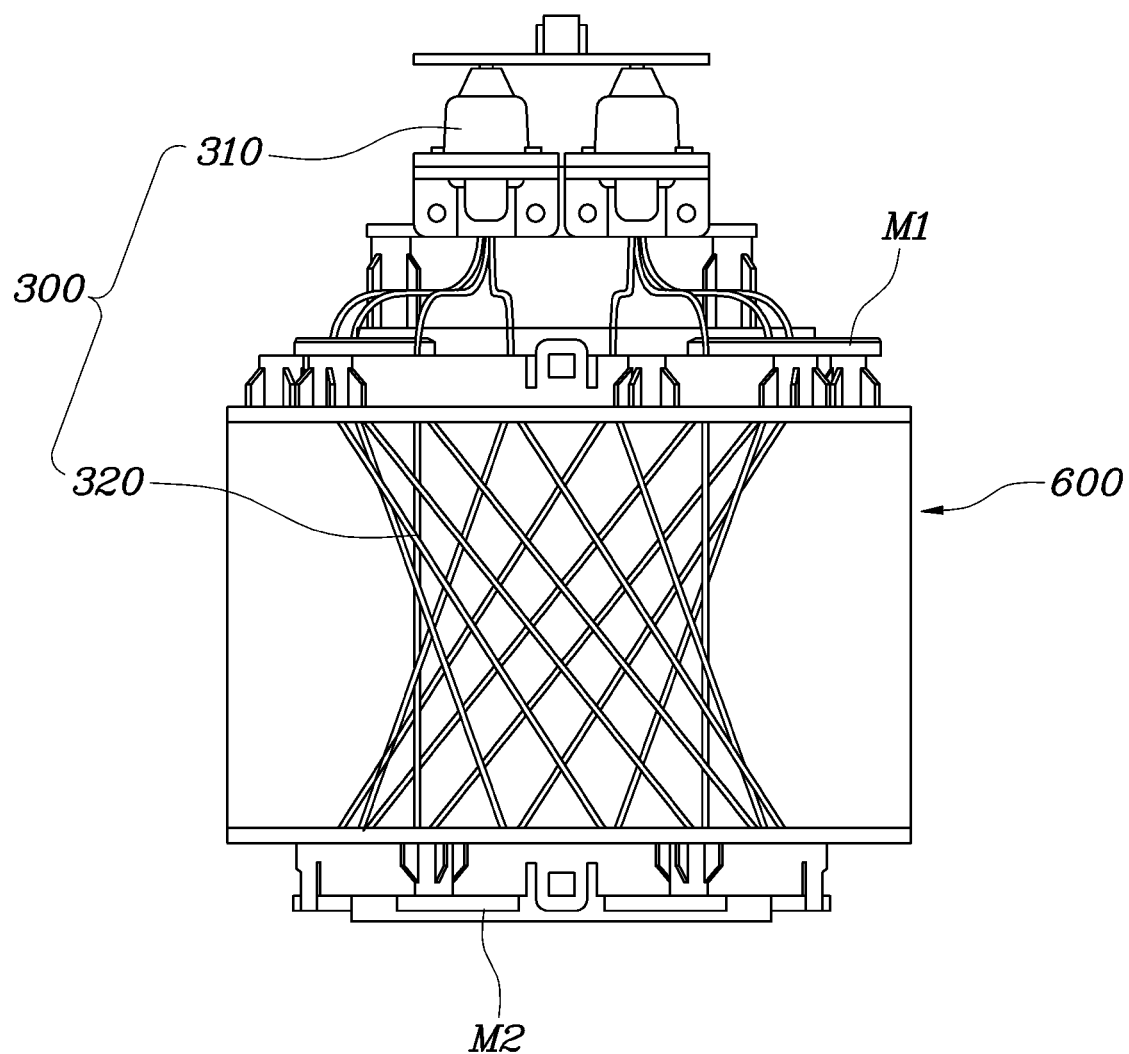
FIG. 1 is a view showing an illumination pattern changing apparatus in some forms of the present disclosure.
Figure 2:
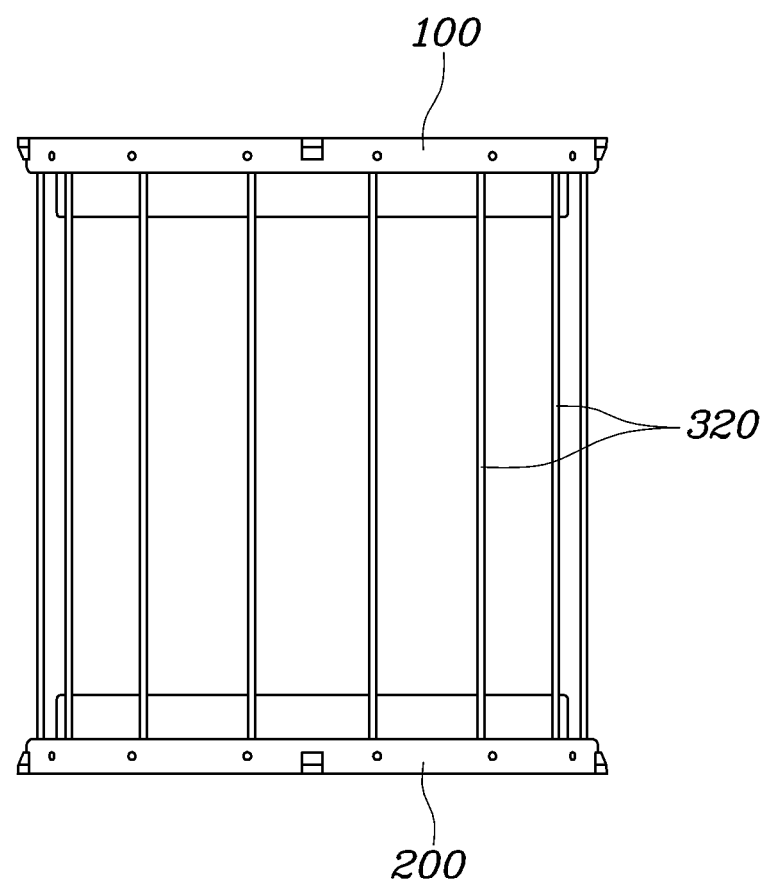
FIGS. 2 and 3 are views showing states before and after operation of the illumination pattern changing apparatus shown in FIG. 1.
Figure 3:
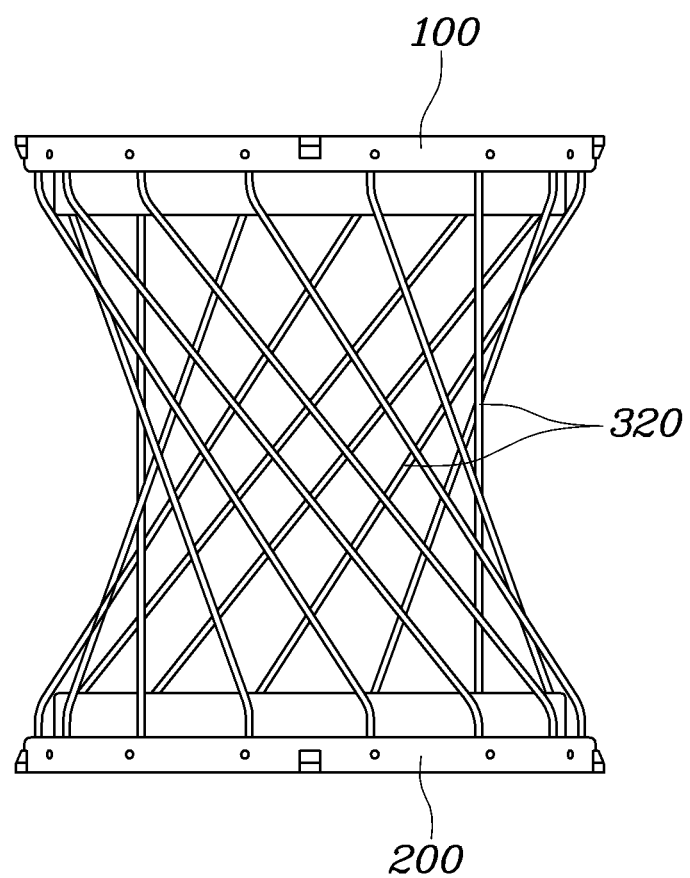

FIG. 1 is a view showing an illumination pattern changing apparatus in some forms of the present disclosure, FIGS. 2 and 3 are views showing states before and after operation of the illumination pattern changing apparatus shown in FIG. 1, FIG. 4 is a view showing an embodiment in which a guide bracket is applied to the illumination pattern changing apparatus in some forms of the present disclosure, FIGS. 5 to 7 are views illustrating a rotary plate, a guide bracket, and a driving unit of the illumination pattern changing apparatus shown in FIG. 4, FIG. 8 is a view showing a horizontal arrangement structure of the illumination pattern changing apparatus, FIGS. 9 and 10 are views showing states before and after operation of the illumination pattern changing apparatus based on the horizontal arrangement structure shown in FIG. 8, FIG. 11 is a view showing a vertical arrangement structure of the illumination pattern changing apparatus, and FIGS. 12 and 13 are views showing states before and after operation of the illumination pattern changing apparatus based on the vertical arrangement structure shown in FIG. 11.

As shown in FIGS. 1 to 3, the illumination pattern changing apparatus in some forms of the present disclosure includes a stationary plate 100, a rotary plate 200 disposed spaced apart from the stationary plate 100, the rotary plate 200 being configured to be rotatable, and a light source module 300 including a light source 310 configured to irradiate light and a plurality of optical fibers 320 configured to emit light when the light irradiated from the light source 310 is incident thereon, wherein one end of each of the optical fibers 320 is connected to the stationary plate 100 and the other end of each of the optical fibers 320 is connected to the rotary plate 200 in order to form an illumination pattern, and the illumination pattern is changed when the rotary plate 200 is rotated.

That is, the stationary plate 100 and the rotary plate 200 are disposed spaced apart from each other, the optical fibers 320 of the light source module 300 are connected to the stationary plate 100 and the rotary plate 200, whereby an illumination pattern may be formed through the optical fibers 320. Here, each of the stationary plate 100 and the rotary plate 200 may be formed in any of various shapes depending on the installation position of the optical fibers 320. In some forms of the present disclosure, each of the stationary plate 100 and the rotary plate 200 is formed in a disc shape.

Meanwhile, the light source 310 of the light source module 300 may include an LED. Light irradiated from the light source 310 is transmitted to the optical fibers 320, whereby the optical fibers 320 emit light. Each of the optical fibers 320 is made of glass or a polymer-based resin. Consequently, each of the optical fibers 320 is flexible and thus is configured to be bent and restored to the original state thereof.

One end of each of the optical fibers 320 is connected to the stationary plate 100 and the other end of each of the optical fibers 320 is connected to the rotary plate 200 to form an illumination pattern. Here, when the rotary plate 200 is rotated, the other end of each of the optical fibers 320 is moved in a rotational direction of the rotary plate 200 in the state in which one end of each of the optical fibers 320 is fixed, whereby the installation form of the optical fibers 320 is changed. As an illumination pattern through the optical fibers 320 is changed based on rotation of the rotary plate 200, as described above, the grade and marketability of an illumination image are improved based on diversification of the illumination pattern.

Specifically, the stationary plate 100 and the rotary plate 200 are disposed opposite each other, and the plurality of optical fibers 320 constituting the light source module 300 is spaced apart from each other along the circumference of each of the stationary plate 100 and the rotary plate 200 so as to be connected to each other in a straight line. When the rotary plate 200 is rotated, the plurality of optical fibers 320 is staggered, whereby the illumination pattern may be changed.

As can be seen from FIG. 1, a housing 600 at which the stationary plate 100 and the rotary plate 200 are installed may be provided. The stationary plate 100 and the rotary plate 200 may be installed at the upper part and the lower part of the housing 600, respectively, such that the stationary plate 100 and the rotary plate 200 are disposed opposite each other. Here, the light source module 300 may be installed at the housing 600 on the stationary plate 100 side. That is, the light source 310 of the light source module 300 is installed at the housing on the stationary plate 100 side, and the optical fibers 320 extending from the light source 310 are connected to the rotary plate 200 through the stationary plate 100. To this end, holes, through which the optical fibers 320 extend, may be formed in each of the stationary plate 100 and the rotary plate 200. The holes are formed in the stationary plate 100 and the rotary plate 200 at the same interval and in the same number. When the optical fibers 320 are installed at the stationary plate 100 and the rotary plate 200, therefore, the plurality of optical fibers 320 extends through the holes H1 of the stationary plate 100 and adhesive is injected into the holes H1 of the stationary plate 100 in order to fix one end of each of the optical fibers 320. Subsequently, the other end of each of the optical fibers 320, after extending through the stationary plate 100, extends through the holes H2 of the rotary plate 200 and adhesive is injected into the holes H2 of the rotary plate 200 in order to fix the other end of each of the optical fibers 320. Here, an upper mount bracket M1 and a lower mount bracket M2 may be fastened to the upper part and the lower part of the housing 600 in order to fix one end and the other end of each of the optical fibers 320.

As described above, the stationary plate 100 and the rotary plate 200 are disposed at the housing 600 so as to be spaced apart from each other, and the rotary plate 200 is rotatably installed. Here, the plurality of optical fibers 320 is spaced apart from each other along the circumference of each of the stationary plate 100 and the rotary plate 200 so as to be connected to each other in a straight line, whereby an illumination pattern as shown in FIG. 2 may be formed.

When the rotary plate 200 is rotated in this state, one end of each of the optical fibers 320 is fixed to the stationary plate 100 and the other end of each of the optical fibers 320 is moved in the rotational direction of the rotary plate 200. As a result, the plurality of optical fibers 320 is staggered, whereby the illumination pattern may be changed to an illumination pattern as shown in FIG. 3. At this time, each of the optical fibers 320 is made of a flexible material so as to be stretched, whereby it is possible to realize an illumination pattern through the optical fibers 320.

Meanwhile, as shown in FIGS. 4 to 7, a guide bracket 400 configured to wrap the circumference of the rotary plate 200 and to guide rotation and axial movement of the rotary plate 200 may be further included. The guide bracket 400 may be separately configured or may be included in the housing 600. The guide bracket 400 is configured to wrap the circumference of the rotary plate 200 such that the rotary plate 200 is rotated or axially moved in the guide bracket 400. When the rotary plate 200 is rotated, therefore, the rotary plate 200 is axially moved in the guide bracket 400, whereby the stretching length of each of the optical fibers 320 is reduced, and therefore durability of the optical fibers 320 is secured.

Specifically, a plurality of guide ribs 210 may be formed on the circumferential surface of the rotary plate 200, and a plurality of guide recesses 410, into each of which a corresponding one of the guide ribs 210 is inserted and each of which extends in a circumferential direction, may be formed along the circumference of the guide bracket 400. That is, the guide ribs 210 of the rotary plate 200 are inserted into the guide recesses 410 of the guide bracket 400, whereby the rotary plate 200 is rotatably installed at the guide bracket 400. In addition, rotation of the rotary plate 200 is allowed by the extension length of each of the guide recesses 410, whereby damage to the optical fibers 320 due to excessive rotation of the rotary plate 200 is prevented. The guide ribs 210 and the guide recesses 410 may be provided in pairs.

Here, each of the guide recesses 410 may extend so as to be inclined or curved in the direction in which the rotary plate 200 is opposite the stationary plate 100. When the rotary plate 200 is rotated, therefore, the guide ribs 210 are moved along the inclined or curved guide recesses 410, whereby the rotary plate 200 is rotated and at the same time is moved in an axial direction, in which the rotary plate 200 is opposite the stationary plate 100. As the rotary plate 200 is axially moved from the guide bracket 400, the stretching length of each of the optical fibers 320 due to rotation of the rotary plate 200 is reduced.

Meanwhile, a driving unit 500 connected to the rotary plate 200 and configured to generate rotary force such that the rotary plate 200 is rotated is further included. The driving unit 500 is provided to automate rotation of the rotary plate 200, and the illumination pattern is changed depending on operation of the driving unit 500.

Specifically, as shown in FIGS. 4 and 5, a portion of the circumferential surface of the guide bracket 400 is open to form an opening 420 configured to expose a portion of the circumferential surface of the rotary plate 200, and the driving unit 500 is connected to the rotary plate 200 through the opening 420 of the guide bracket 400. As a result, the rotary plate 200 in the guide bracket 400 is connected to the driving unit 500 through the opening 420 so as to be rotated by the driving unit 500. Here, the opening 420 may be formed at the position of the guide bracket 400 spaced apart from the guide recess 410, and may be formed so as to have a sufficient width that the connection state between the rotary plate 200 and the driving unit 500 is maintained even when the rotary plate 200 is moved axially from the guide bracket 400. Consequently, the driving unit 500 may be located in the opening 420 of the guide bracket 400, and the rotary plate 200 and the driving unit 500 may be connected to each other through the opening 420.

Specifically, a plurality of gear protrusions 220 may be formed on the circumferential surface of the rotary plate 200, and the driving unit 500 may include a gear portion 520 engaged with the gear protrusions 220 of the rotary plate 200 and a driving portion 510 configured to rotate the gear portion 520 such that the rotary plate 200 is rotated with the gear portion 520.

That is, the gear protrusions 220 of the rotary plate 200 and the gear portion 520 of the driving unit 500 are connected to each other through a gear structure, whereby the rotary plate 200 is rotated when the gear portion 520 is rotated by the driving portion 510. In addition, the circumferential surface of the rotary plate 200 is exposed through the opening 420 of the guide bracket 400, whereby the gear portion 520 is easily engaged with the gear protrusions 220 of the rotary plate 200. Here, the gear protrusions 220 may be formed on a portion of the circumferential surface of the rotary plate 200, and the driving portion 510 may be constituted by a motor capable of rotating in alternating directions and may be operated according to user intention or control.

In some forms of the present disclosure, therefore, the position of the optical fibers 320 is changed depending on rotation of the rotary plate 200 based on operation of the driving portion 510, whereby the illumination pattern may be diversified. In addition, when rotated, the rotary plate 200 is axially moved from the guide bracket 400, whereby stretching of the optical fibers 320 is reduced.

Meanwhile, the stationary plate 100, the rotary plate 200, the light source module 300, and the guide bracket 400 of the present disclosure may be provided in plural.

In an embodiment, as shown in FIGS. 8 to 10, the stationary plate 100, the rotary plate 200, the light source module 300, and the guide bracket 400 may constitute a single illumination assembly S, and a plurality of illumination assemblies may be disposed in a horizontal direction. Each of the illumination assemblies S may be provided with a driving unit 500 such that the illumination assemblies S can be individually controlled. Alternatively, the plurality of illumination assemblies S may be integrally controlled by a single driving unit 500.

In the case in which the plurality of illumination assemblies S is configured to be integrally controlled, the guide bracket 400 of each illumination assembly may be provided with a plurality of openings 420 formed so as to be opposite the openings 420 of other guide brackets 400.

In addition, the plurality of rotary plates 200 may be simultaneously rotatably connected to each other via connection portions 530 disposed between the respective guide brackets 400 so as to be connected to at least two rotary plates 200 through the openings 420 of the guide brackets 400.

Here, a plurality of gear protrusions 220 is formed on the circumferential surface of each of the rotary plates 200, and connection protrusions 531 configured to be engaged with the gear protrusions 220 are formed on the circumferential surface of each of the connection portions 530, whereby the rotary plates 200 and the connection portions 530 are gear-engaged with each other. When the connection portions 530 are rotated, therefore, the rotary plates 200 may also be rotated. The connection portions 530 are formed in the same size and in the same number as the connection protrusions 531. Consequently, the rotary plates 200, connected with each other via the connection portions 530, may be rotated at the same rotation angle.

The openings 420 of each guide bracket 400 are formed so as to be opposite the openings 420 of guide brackets 400 adjacent thereto, and a connection portion 530 is provided between one opening 420 and another opening 420, whereby the rotary plates 200 provided in the respective guide brackets 400 are connected to each other via the connection portions 530.

Here, the driving unit 500 may be connected to one of the plurality of connection portions 530. As the connection portion 530 to which the driving unit 500 is connected is rotated, the plurality of rotary plates 200 may be simultaneously rotated.

When one of the connection portions 530 to which the driving unit 500 is connected is rotated, therefore, the rotary plates 200 connected to each other via the connection portions 530 may be simultaneously rotated, whereby the illumination patterns of the illumination assemblies S may be simultaneously changed.

In the state in which the plurality of illumination assemblies S, each of which includes the stationary plate 100, the rotary plate 200, the light source module 300, and the guide bracket 400, is provided and the illumination assemblies S are disposed in the horizontal direction, as described above, the optical fibers 320 of each illumination assembly may initially form a straight illumination pattern, as shown in FIG. 9. When the rotary plates 200 are rotated via the connection portions 530 by operation of the driving unit 500, the optical fibers 320 of each illumination assembly may form a staggered illumination pattern, as shown in FIG. 10.

On the other hand, in another embodiment, as shown in FIGS. 11 to 13, the stationary plate 100, the rotary plate 200, the light source module 300, and the guide bracket 400 may be disposed in plural in a vertical direction. In the case in which the elements are disposed in the vertical direction, as described above, a plurality of rotary plates 200 and a plurality of guide brackets 400 may be disposed in series above a single stationary plate 100, one end of each of the optical fibers 320 constituting the optical module 300 may be connected to the stationary plate 200, and the other end of each of the optical fibers 320 may extend through the rotary plates 200 and may be connected to the last rotary plate 200.

That is, the stationary plate 100 is disposed at the uppermost end or lowermost end, and the rotary plates 200 and the guide brackets 400 are disposed in series in a direction opposite the stationary plate 100. Here, one rotary plate 200 and one guide bracket 400 constitute a single illumination unit, and a plurality of illumination units is arranged above the stationary plate 100 in the vertical direction. In particular, one end of each of the optical fibers 320 constituting the light source module 300 is fixed to the stationary plate 100, and the other end of each of the optical fibers 320 extends through a plurality of rotary plates 200 and is connected to the last rotary plate 200. That is, the optical fibers 320 are not connected to each of the rotary plates 200 but sequentially extend through the plurality of rotary plates 200 from the stationary plate 100.

Here, the driving unit 500 may include a driving portion 510 configured to generate rotational force and a driving link 540 extending from the driving portion 510 in the vertical direction, the driving link 540 being provided with a plurality of gear fastening portions 451 connected to the respective rotary plates 200 through the openings 420 of the guide brackets 400. That is, the driving unit 500 includes a driving portion 510 and a driving link 540. The driving link 540 extends long in a direction in which the rotary plates 200 are arranged, and is provided with gear fastening portions 451 connected to the respective rotary plates 200. At the time of operation of the driving portion 510, therefore, the rotary plates 200 are simultaneously rotated by rotation of the driving link 540.

In particular, the gear fastening portions 451 of the driving link 540 may be configured so as to have smaller gear ratios thereof to the rotary plates 200 in a direction away from the stationary plate 100. In this embodiment, one end of each of the optical fibers 320 is fixed to the stationary plate 100, and the other end of each of the optical fibers 320 extends through the respective rotary plates 200 and is connected to the last rotary plate 200. The rotary plates 200 are simultaneously rotated. When the rotary plates 200 are rotated by operation of the driving portion 510, therefore, the overall position of the optical fibers 320 is not changed in the case in which the rotary plates 200 are rotated at the same rotational angle.

Consequently, the gear fastening portions 451 of the driving link 540 are configured so as to have smaller gear ratios thereof to the rotary plates 200 in the direction away from the stationary plate 100. Here, each of the gear fastening portions 451 may include a driving gear 541a coupled to the driving link 540 so as to be rotated with the driving link 540 and a driven gear 541b engaged with the driving gear 541a and a corresponding one of the rotary plates 200. That is, the rotation angle of each of the rotary plates 200 based on ration of the driving link 540 may be changed through setting of the gear ratio of the driving gear 541a to the driven gear 541b.

As an example, as shown in FIG. 11, assuming that a first illumination unit S2, a second illumination unit S3, a third illumination unit S4, and a fourth illumination unit S5, each of which includes a rotary plate 200 and a guide bracket 400, are arranged in a direction away from the stationary plate 100, the driven gears 541b of the gear fastening portions 451 connected to the rotary plates 200 of the illumination units may be configured to have a gear ratio of 1:2:3:4 in order.

When the driving link 540 is rotated by operation of the driving portion 510, therefore, the rotary plates 200 of the first illumination unit S2, the second illumination unit S3, the third illumination unit S4, and the fourth illumination unit S5 are simultaneously rotated. Since the gear ratios of the driven gears 541b are different from each other, however, the rotational angles of the rotary plates 200 are increased in the order of the first illumination unit S2, the second illumination unit S3, the third illumination unit S4, and the fourth illumination unit S5, whereby it is possible to realize a change in the illumination pattern based on overall positional change of the optical fibers 320.

In addition, a plurality of guide ribs 210 may be formed on the circumferential surface of each of the rotary plates 200, and a plurality of guide recesses 410, into each of which a corresponding one of the guide ribs 210 is inserted and each of which extends in a circumferential direction, may be formed along the circumference of each of the guide brackets 400. The guide recesses 410 of each of the guide brackets 400 may extend in a direction away from the stationary plate 100. Here, the guide recesses 410 extend so as to be inclined or curved in the direction in which each of the rotary plates 200 is opposite the stationary plate 100. As the rotary plate 200 is axially moved from the guide bracket 400, therefore, the stretching length of each of the optical fibers 320 due to rotation of the rotary plate 200 is reduced.

In particular, the guide recesses 410 formed in each of the guide brackets 400 extend long in the direction away from the stationary plate 100. As the gear fastening portions 451 are configured so as to have smaller gear ratios thereof to the rotary plates 200 in the direction away from the stationary plate 100, as described above, the rotary plates 200 are rotated at larger rotational angles in the direction away from the stationary plate 100. Consequently, the guide recesses 410 formed in each of the guide brackets 400 are formed so as to extend long in the direction away from the stationary plate 100.

In the case in which the stationary plate 100, the rotary plates 200, the light source module 300, and the guide brackets 400 are arranged in the vertical direction, as described above, the optical fibers 320 may initially form a straight illumination pattern, as shown in FIG. 12. When the rotary plates 200 are rotated at different rotational angles by rotation of the driving link 540 based on operation of the driving unit 500, the optical fibers 320 may form a staggered illumination pattern, as shown in FIG. 13.

In the illumination pattern changing apparatus having the structure described above, an illumination design is realized through the optical fibers, and the grade and marketability of the illumination image are improved through a change in the illumination design.

Although the preferred embodiments of the present disclosure have been described above with reference to the accompanying drawings, those skilled in the art will appreciate that the present disclosure can be implemented in various other embodiments without changing the technical ideas or features thereof.

What is claimed is:

1. An illumination pattern changing apparatus comprising:
   a stationary plate;
   a rotary plate disposed spaced apart from the stationary plate, the rotary plate configured to be rotatable; and
   a light source module comprising:
      a light source configured to irradiate light; and
      a plurality of optical fibers configured to emit the light when the light is irradiated,
   wherein a first end of each optical fiber is connected to the stationary plate and a second end of each optical fiber is connected to the rotary plate to form an illumination pattern, and the illumination pattern is changed when the rotary plate is rotated.

2. The illumination pattern changing apparatus according to claim 1, wherein:
   the stationary plate and the rotary plate are installed at a housing, the stationary plate being disposed opposite from the rotary plate,
   the light source module is installed at the housing on a stationary plate side, the plurality of optical fibers is spaced apart from each other along a circumference of the stationary plate and the rotary plate,
   the plurality of optical fibers is connected in a straight line to form the illumination pattern, and
   when the rotary plate is rotated, the plurality of optical fibers is staggered and the illumination pattern is changed.

3. The illumination pattern changing apparatus according to claim 1, further comprising:
   a guide bracket configured to:
      wrap a circumference of the rotary plate; and
      guide rotation and axial movement of the rotary plate.

4. The illumination pattern changing apparatus according to claim 3, wherein:
   a plurality of guide ribs is formed on the circumference of the rotary plate, and
   a plurality of guide recesses is formed along a circumference of the guide bracket, the plurality of guide recesses extending in a circumferential direction, wherein each guide rib is inserted into each guide recess.

5. The illumination pattern changing apparatus according to claim 4, wherein each guide recess extends to be inclined or curved in a direction in which the rotary plate is opposite from the stationary plate.

6. The illumination pattern changing apparatus according to claim 3, further comprising:
   a driving unit connected to the rotary plate, the driving unit configured to generate a rotary force to rotate the rotary plate.

7. The illumination pattern changing apparatus according to claim 6, wherein:
   a portion of a circumferential surface of the guide bracket is open to form an opening, a portion of a circumferential surface of the rotary plate exposed in the opening, and
   the driving unit is connected to the rotary plate through the opening.

8. The illumination pattern changing apparatus according to claim 7, wherein:
   a plurality of gear protrusions is formed on the circumferential surface of the rotary plate, and
   the driving unit comprising:
      a gear portion engaged with the plurality of gear protrusions; and a driving portion configured to rotate the gear portion to rotate the rotary plate with the gear portion.

9. The illumination pattern changing apparatus according to claim 7, wherein:
each of the stationary plate, the rotary plate, the light source module, and the guide bracket is formed in a single illumination assembly, and
when each illumination assembly is disposed in a horizontal direction, the guide bracket of each illumination assembly is provided with a plurality of openings formed opposite from the openings of other guide brackets.

10. The illumination pattern changing apparatus according to claim 9, wherein the plurality of rotary plates is simultaneously rotatably connected to each other via connection portions disposed between each guide bracket to be connected to at least two rotary plates through the openings of the guide brackets.

11. The illumination pattern changing apparatus according to claim 10, wherein the driving unit is connected to the plurality of connection portions, the plurality of rotary plates being simultaneously rotated when the connection portion is rotated.

12. The illumination pattern changing apparatus according to claim 10, wherein:
a plurality of gear protrusions is formed on the circumferential surface of each rotary plate, and
a plurality of connection protrusions configured to be engaged with the gear protrusions that are formed on a circumferential surface of each connection portion.

13. The illumination pattern changing apparatus according to claim 7, wherein, when each of the stationary plate, the rotary plate, the light source module, and the guide bracket is disposed in a vertical direction, a plurality of rotary plates and a plurality of guide brackets are disposed in series above a single stationary plate, a first end of each optical fiber is connected to the stationary plate, and a second end of each optical fiber extends through the rotary plates and is connected to a last rotary plate.

14. The illumination pattern changing apparatus according to claim 13, wherein the driving unit comprises:
a driving portion configured to generate a rotational force; and
a driving link extending from the driving portion in the vertical direction, the driving link provided with a plurality of gear fastening portions connected to respective rotary plates through the openings of the guide brackets.

15. The illumination pattern changing apparatus according to claim 14, wherein the plurality of gear fastening portions is configured to have smaller gear ratios in a direction away from the stationary plate.

16. The illumination pattern changing apparatus according to claim 14, wherein each gear fastening portion comprises:
a driving gear coupled to the driving link to be rotated with the driving link; and
a driven gear engaged with the driving gear and the rotary plates.

17. The illumination pattern changing apparatus according to claim 13, wherein:
a plurality of guide ribs is formed on a circumferential surface of each rotary plate,
a plurality of guide recesses is formed along a circumference of each guide bracket, the plurality of guide recesses extending in a circumferential direction, wherein each guide rib is inserted into each guide recess, and
each guide recess is formed to have a long extension length in a direction away from the stationary plate.

\* \* \* \* \*